Figure 1:
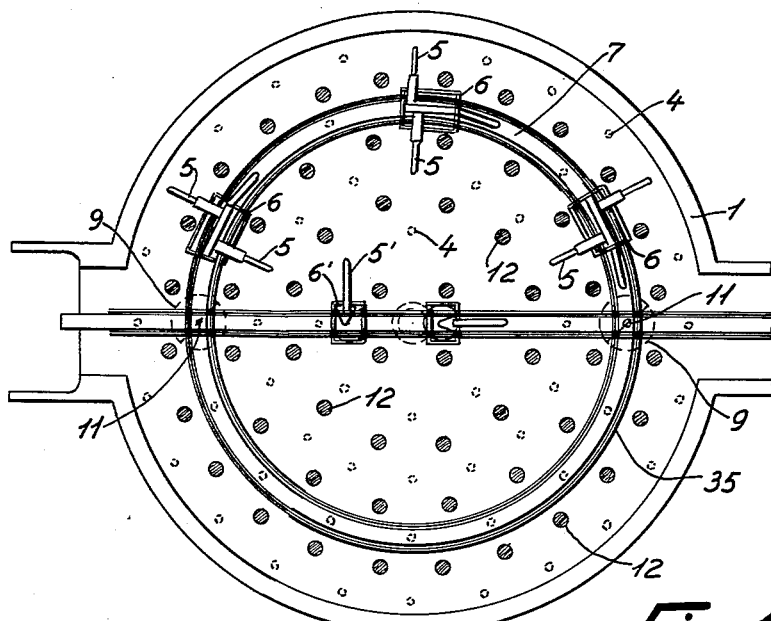

June 25, 1963            J. MAALØE            3,095,098

APPARATUS FOR THE CONVEYING OF SILO GOODS

Filed Feb. 20, 1961            5 Sheets-Sheet 1

INVENTOR

Johannes Maaløe

BY
Watson, Cole, Grindle & Watson
ATTORNEYS

June 25, 1963  J. MAALØE  3,095,098
APPARATUS FOR THE CONVEYING OF SILO GOODS
Filed Feb. 20, 1961  5 Sheets-Sheet 2

INVENTOR
Johannes Maaløe

BY Watson, Cole, Grindle & Watson
ATTORNEYS

June 25, 1963 J. MAALØE 3,095,098
APPARATUS FOR THE CONVEYING OF SILO GOODS
Filed Feb. 20, 1961 5 Sheets-Sheet 3

INVENTOR
Johannes Maaløe
BY
ATTORNEYS

United States Patent Office 3,095,098
Patented June 25, 1963

3,095,098
APPARATUS FOR THE CONVEYING OF SILO GOODS
Johannes Maaløe, Gorlev, Denmark, assignor to Aktieselskabet de Danske Sukkerfabrikker, Copenhagen, Denmark
Filed Feb. 20, 1961, Ser. No. 90,469
Claims priority, application Denmark Feb. 26, 1960
6 Claims. (Cl. 214—17)

This invention relates to an apparatus for the conveying of silo goods between any one of a plurality of openings of a silo and a charging or discharging station common to said openings.

With regard to the distribution of load in a silo it is essential that the bulk goods to be stored should be supplied to and taken off from the silo in such a manner as to maintain, as far as possible, a uniform distribution of load over the whole cross section of the silo and thereby over the whole of the bottom of the silo. Goods are ordinarily taken off from a silo through openings of the silo bottom, and it is well known to conduct the goods along chutes from one or more of these bottom openings to a separate conveyor on which it is conveyed to a predetermined discharging station from which the goods are passed on by means of belt conveyors or in other suitable manner. However, the bottom of a silo is subjected to very heavy stress and must therefore be supported on a multitude of uniformly distributed supporting pillars, the spacing of which is usually so short that there is no room left under the silo for big mobile conveyors for conveying the goods discharged through the bottom holes of the silo out from under the silo. It has therefore been necessary up to now, to use either an arrangement of several stationary conveyors or a smaller number of stationary conveyors in combination with some mobile conveyors to be moved around in the area under the silo bottom. These known methods of conveying the goods discharged from the silo have been found to be rather time-consuming and inconvenient and additionally they involve repeated delivery of silo goods from one conveyor to another with consequent stirring up of dust from the silo goods so that it becomes necessary to use a dust evacuation system that complicates the silo plant.

The difficulties explained are particularly pronounced in the case of silos of relatively large dimensions and with corresponding, relatively great distances between the various bottom openings. In such large size silos, similar troubles are also encountered in distributing silo goods to a plurality of charging openings by separately conveying the discrete quantities of goods to the various charging openings.

It is the primary object of the invention to remedy the above mentioned drawbacks in the conveying of silo goods discharged through bottom holes of a silo from the discharging positions to a common discharging station adjacent the silo, but as will be understood the invention may also be applied to systems for the distribution of silo goods to a plurality of charging openings of a silo.

For the conveying of goods discharged from any one of a plurality of bottom openings of a silo to a common discharging station, use is made according to the invention of an annular conveying member consisting of at least one annular band conveyor movable in a horizontal plane around a vertical axis located in a central position with respect to the silo and to the band conveyor, the goods discharged through any one of a plurality of the bottom holes of the silo being transferred from the bottom hole in question to the said band conveyor by means of separate devices, e.g. chutes mounted on transfer devices movable along the length of the band conveyor. For the distribution of silo goods to various charging positions of a silo from a common charging station adjacent the silo, use may likewise be made, according to the invention, of an annular conveyor movable around a vertical axis past the various charging openings of the silo.

In the following the invention will be described in further detail with particular reference to the discharge of silo goods through a plurality of bottom openings of a silo, and it will then be directly apparent how the invention may be similarly applied to the supply of goods to a plurality of charging openings of a silo from a common charging station adjacent the silo.

According to one embodiment of the invention, as applied to the discharge of goods through bottom openings of a silo, the conveying apparatus, in addition to the above mentioned annular band conveyor, also comprises a second band conveyor movable transversely of said annular band conveyor in a horizontal or substantially horizontal plane below same and arranged to receive the goods transferred to said annular conveyor from said bottom openings and to convey the goods thus received out from under the silo.

In combination with the said transverse band conveyor or the said annular band conveyor or both, there may advantageously be provided, according to the invention, one or more loading devices movable along the length of said band conveyor or conveyors, each such loading device being constructed with chutes rotatable about a vertical axis or a horizontal axis or both.

In a preferred embodiment of the invention, each chute is composed of two or more telescopically connected tubes.

The transfer of the discharged goods from the annular band conveyor to the transverse band conveyor may e.g. be effected automatically by means of a scraper arranged above the annular band conveyor in a zone in which this band conveyor moves across the transverse band conveyor.

According to a further aspect of the invention, the annular band convyeor may be carried by two annular rails provided under said conveyor band and rigidly connected co-axially thereto, each of said annular rails being supported on a plurality of rotatably mounted supporting rollers arranged in a circular row co-axial with said conveyor band, the annular band conveyor being guided radially by means of a plurality of guiding rollers, each being mounted for rotation on a vertically disposed, horizontally displaceable gudgeon provided under said band conveyor, and engaging one of said rails.

Any suitable means may be used for rotating the annular band conveyor at a suitable speed. According to a preferred arrangement, the annular band conveyor is coupled to a driving motor by means of a wire drive extending from a pulley on said motor or a gear transmission associated therewith via one or more guiding rollers and a tensioning roller to and around the outer one of the two annular supporting rails of the annular band conveyor, the supporting rail in question thus additionally serving as a driving ring of the band conveyor.

It is within the scope of the invention, particularly as applied to silos of very large cross section, to provide two, or if desired even more, annular band conveyors of the kind described under the bottom of the silo. These band conveyors may all be co-axial and be arranged at mutual radial spacings so selected with regard to the spacings of the rows of bottom holes of the silo that goods may be conducted from any bottom hole of the silo to the band conveyor closest thereto by means of chutes or similar take-off devices of suitable, convenient dimensions, preferably by means of the above mentioned telescopic tubes mounted on displaceable loading devices for rotation about vertical or horizontal or both vertical and horizontal axes.

If more than one annular band conveyor is used, the above mentioned transverse band conveyor is arranged to extend below all of the annular band conveyors so that goods transferred to these band conveyors may be discharged from any of these conveyors to the transverse band conveyor serving to convey the goods out from under the silo.

Figure 2:
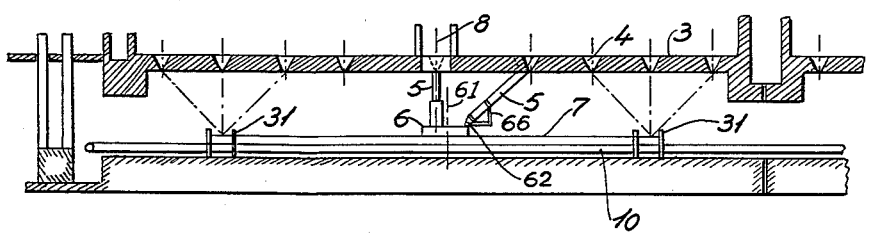
Figure 3:
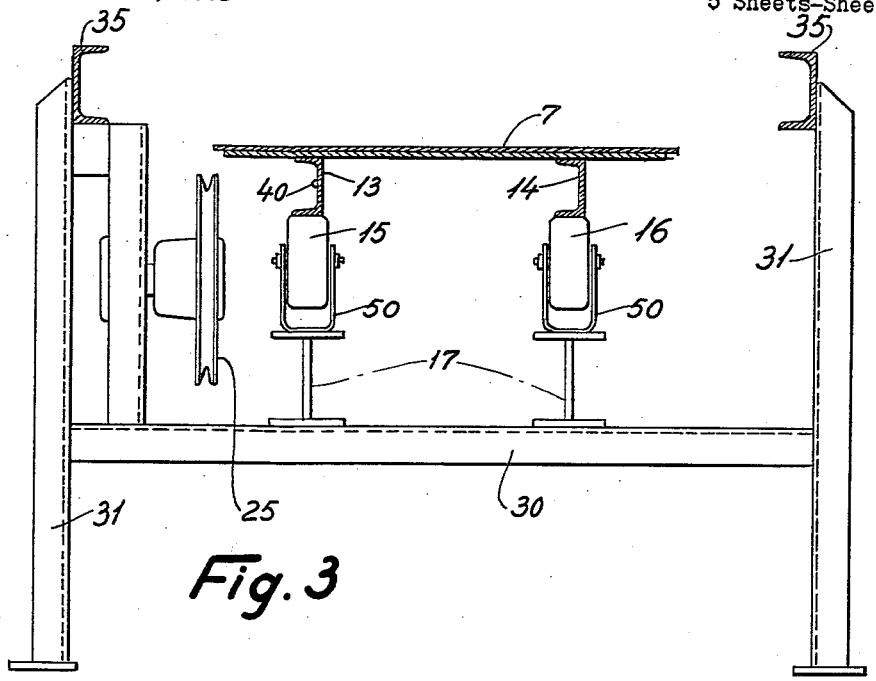
Figure 4:
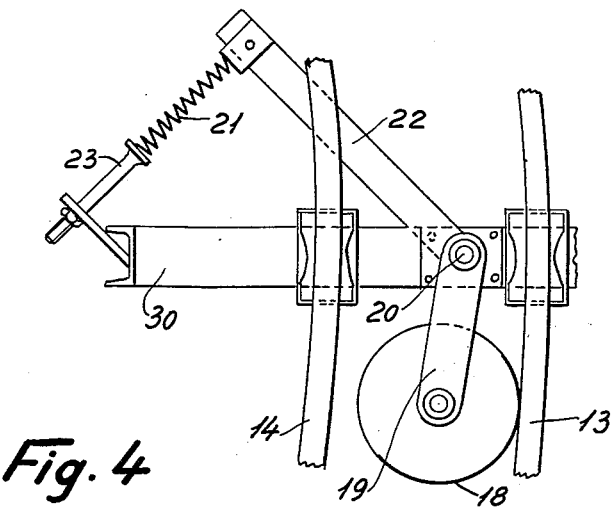
Figure 5:
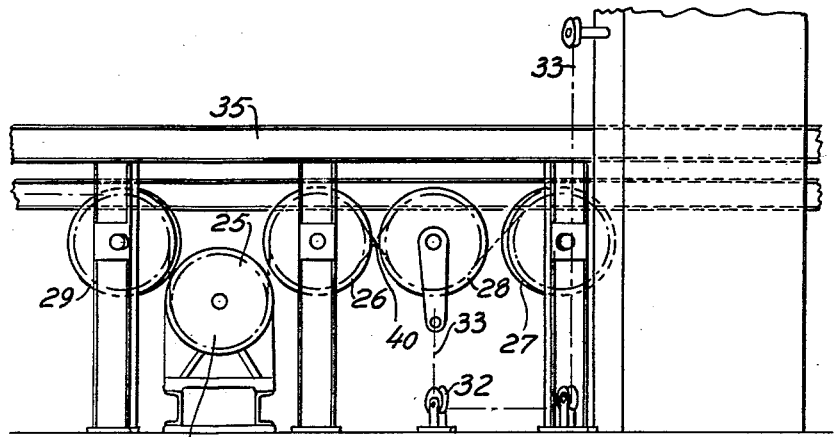
Figure 6:
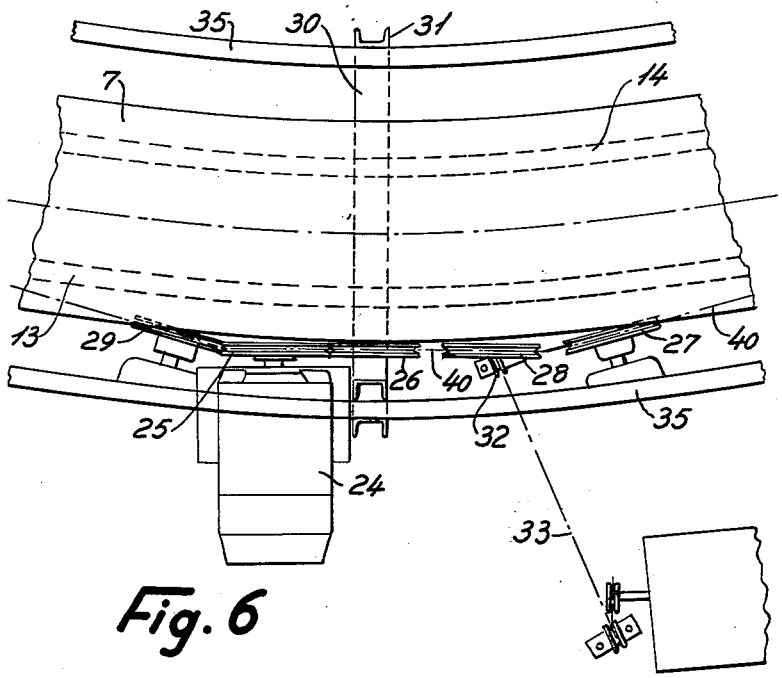
Figure 7:
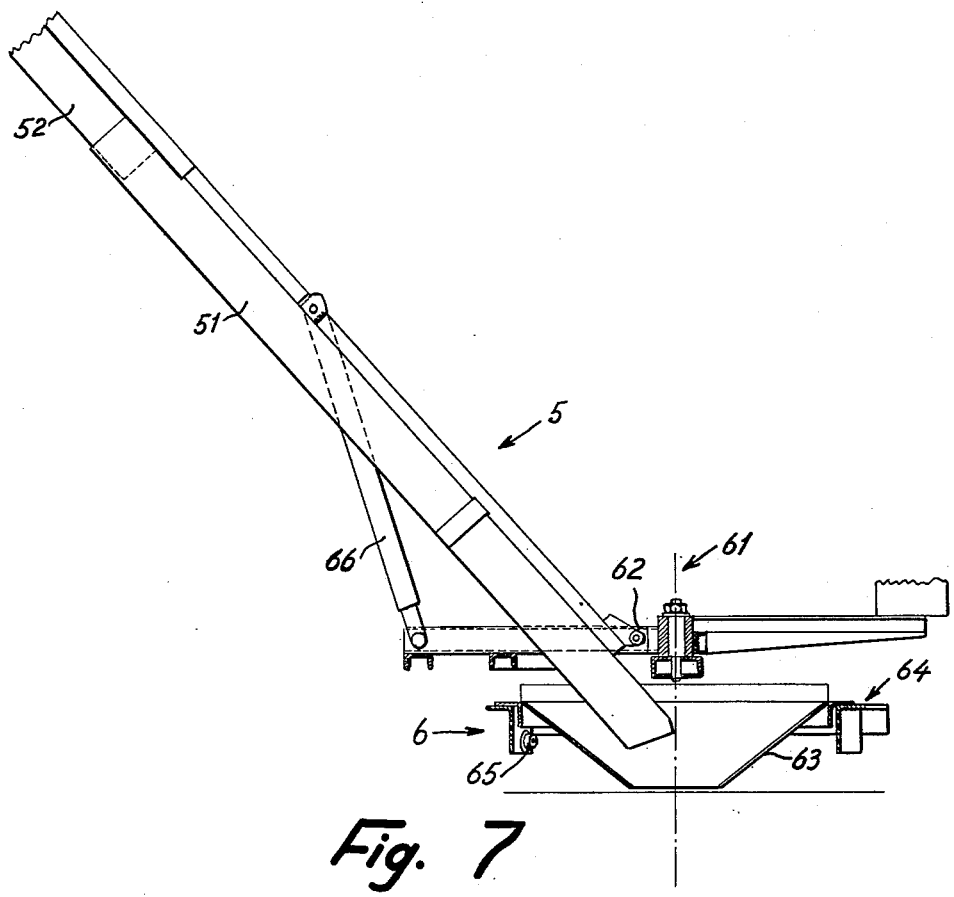
Figure 8:
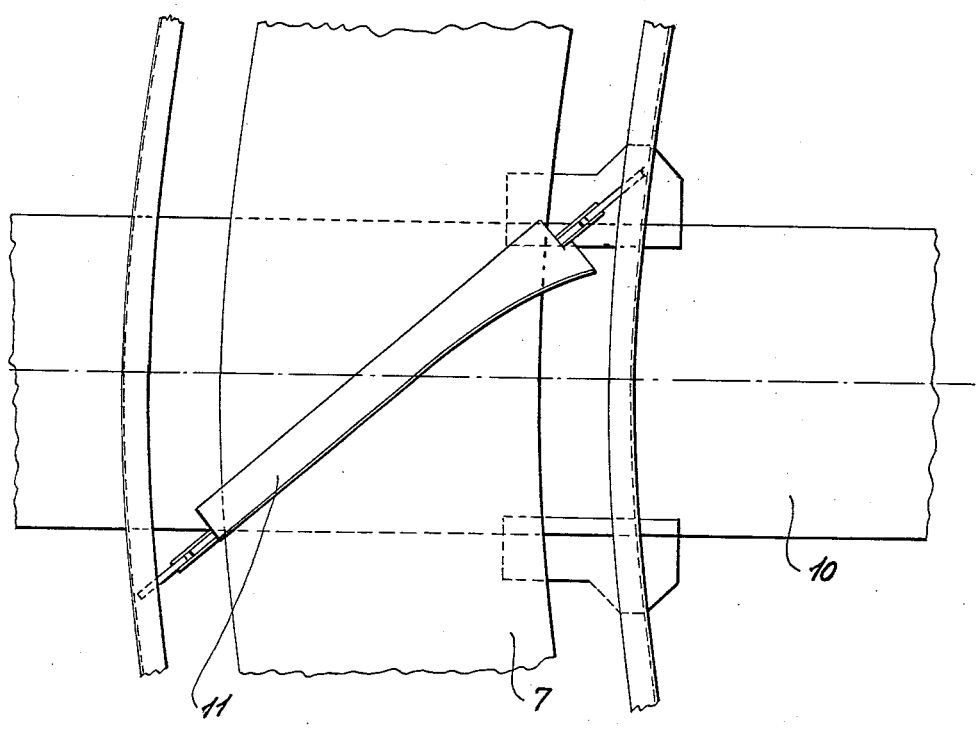

Further aspects and details of the invention will be apparent from the following detailed description of an embodiment of a conveying apparatus according to the invention illustrated in the accompanying drawings in which FIG. 1 shows a conveying apparatus according to the invention, as installed in the pit under a silo, the conveying apparatus being seen in top plan view, FIG. 2 shows diagrammatically a vertical section through the conveying apparatus of FIG. 1 and the bottom of the silo, FIG. 3 shows a cross section through the annular conveyor, FIG. 4 shows on a larger scale a top plan view of one of a plurality of guiding units distributed along the circumference of the annular band conveyor, said units serving to guide the said conveyor in its circular path of movement, FIG. 5 shows part of a mechanism for operating the conveyor in side view, FIG. 6 is a top plan view of same, FIG. 7, a vertical section on an enlarged scale through a loading device and one of the chutes mounted thereon, and FIG. 8, a plan view on an enlarged scale of the scraper transfer arrangement.

In FIGURES 1 and 2, 1 is the wall of a pit under a silo, the bottom 3 of which is shown in FIG. 2. This bottom has in known manner several rows of bottom holes 4 through which goods stored in the silo, e.g. sugar, can be discharged from the silo and be conducted from these bottom holes, e.g. via channel shaped or tubular rotatable chutes 5 to a loading device 6 arranged above an annular band conveyor 7 and movable along the length of same, from which loading device the goods can in turn be discharged onto the annular band conveyor 7. Each loading device may e.g. consist of a hopper 63 mounted on a carriage 64 supported by means of rollers, one of which is shown at 65 in FIG. 7, on circular rails, such as the rails 35 referred to below. As will be described in further detail below, the annular band conveyor 7 is mounted for rotation about an axis 8 which is centrally disposed with respect to the band and usually coincides with the vertical axis of the silo.

In the drawing, a plurality of such loading devices 5, 6 are shown, each of which is capable simultaneously to receive goods from several, in the example illustrated three bottom openings of the silo by means of the chutes 5' which are mounted on the respective loading device 6 for rotation about a vertical axis 61 and a horizontal axis 62, each chute preferably consisting of two or more telescopically connected tubes 51, 52, a supporting telescopic lever 66 serving to vary the inclination of the chute and to maintain it at the inclination at which it has been set.

By means of the loading device 6, the goods taken off from the silo are loaded on to the annular band conveyor 7 which is rotated about the axis 8 by means of a drive mechanism to be described below. During the rotating movement of the annular band conveyor, the goods conveyed thereon arrive at one or the other of the two zones of the path of movement of the band indicated by the dotted lines 9 in FIGURE 1, where the goods are transferred in a manner known per se to a horizontally disposed band conveyor 10 that extends below the annular band conveyor 7—in the example illustrated diametrically with respect thereto—and serves to convey the goods transferred thereto out from under the silo in one or the other direction. At this band chutes 5' connected to loading devices 6' may be provided for the purpose of discharging goods from the bottom holes 4 of the silo in closest proximity to this band directly onto same so that these goods will be conveyed out from under the silo together with the goods transferred thereto from the band 7, e.g. in the direction of the arrow in FIG. 1.

The transfer of the good conveyed on the annular band 7 to the band 10 may e.g. be effected by means of scrapers 11, FIG. 8, arranged above the band 7 in close proximity to the upper surface thereof, the said scrapers being disposed at an angle to the direction of movement of the band in the zone where the two bands cross each other, so as to wipe off the material conveyed towards the scrapers on the band 7 and thereby to transfer this material to the band 10.

12, FIG. 1, are supporting pillars on which the bottom of the silo is supported.

FIGS. 3—4 show details of a suitable form of the annular band conveyor 7 and the means serving to support and guide same in its rotary motion, while the means serving to drive the annular band conveyor 7 are illustrated in FIGS. 5 and 6. In the example shown the band 7 is mounted on two rings 13 and 14 which are both co-axial with the band 7 and in the example illustrated each consists of an annular channel bar. These rings are welded to or otherwise rigidly connected with the bottom side of the band 7 and each of these rings is supported on a plurality of rollers 15 and 16, respectively, arranged in two circular rows concentric with the band 7, each of the rollers 15 and 16 being rotatably mounted in bearing structures 50 attached to supporting members 17, which as illustrated in FIG. 3 may again be supported on transverse members 30 of gallows 30, 31.

Instead of supporting the band conveyor 7 on the rollers 15 and 16 mounted for rotation about stationary horizontal axes, supporting rollers may be used, which are mounted on supporting rails 13 and 14 of the annular band conveyor 7 and run on stationary rails in the pit under the silo.

The annular band conveyor may be guided in its circular path of movement by means of three or more guiding units of the kind illustrated in FIG. 4, said units being uniformly distributed along the circumference of the annular band conveyor. Each of these guiding units consists substantially of a guiding roller 18, FIG. 4, which is rotatably mounted on the free end of an arm 19, the latter being in turn rotatable about a vertical gudgeon 20, FIG. 4, mounted on the transverse member 30, FIGS. 3 and 4, of the transverse frame 30, 31, a spring 21, acting on the free end of another arm 22 rigidly connected with the arm 19, keeping the guiding roller 18 resiliently in engagement with the inner side of the outer ring 13 of the annular band conveyor 7, FIG. 3, at a pressure that may be controlled by means of a tightening screw 23 of the spring 21.

As illustrated in FIGS. 5 and 6 the annular band conveyor 7 may be driven by means of a wire drive 40 which from a pulley 25 driven by a motor 24, FIGS. 5 and 6, extends via guiding rollers 26 and 27 and, if desired, also via a tensioning or biasing roller 28 of known kind to the outer supporting ring 13, FIGS. 3 and 6, of the annular band conveyor 7 and then around this supporting ring to a guiding roller 29 and from there back to the pulley 25. As illustrated in FIG. 5, the tensioning roller 28 may be biased by means of a weight, not shown, suspended in a wire 33, so that the latter acts on the tensioning roller via guiding rollers 32 at a downward pull keeping the wire 40 taut around the ring 13.

As is apparent from FIG. 6, the two outermost guiding rollers 27 and 29 for the wire 40 are disposed at an angle to the circumference of the band conveyor so as to guide the wire 40 tangentially to and from the ring 13 without sharp bends.

As illustrated in FIG. 6, the three pulleys 26, 27 and 29 may be mounted on a supporting frame formed by gallows 30, 31 and two annular frame members 35 co-axial with the band conveyor 7, the said supporting frame serving at the same time, in the embodiment illustrated, to support the annular band conveyor 7.

As mentioned, the form of conveying apparatus described above by way of example is intended for conveying goods taken off from a plurality of bottom holes of a silo to a common discharge station, but an annular conveying band of substantially the same constructional form as above described may, if arranged above the top of a silo, be used for the filling of goods from above into different cross sectional zones of the silo, whereby a uniform distribution of the goods over the cross section of a silo can be obtained, and the occurrence in the silo of useless voids as a consequence of a non-uniform distribution of the goods can be avoided. It therefore becomes possible to keep the height and cross section of a silo for a given capacity smaller than hitherto possible. When using a conveyor according to the invention, for the filling-in of goods into a silo, the displaceable loading device 6 may, e.g., be replaced by a displaceable scraper while the rotatably mounted chutes 5 will be directed downwards and arranged in such a manner as to project from the scraper in level with or below the band conveyor.

I claim:

1. A conveying apparatus for operative association with any one of a plurality of openings of a silo, such openings being distributed both radially and circumferentially over the cross sectional area of said silo, and an exchange station common to said openings, said apparatus comprising an annular band conveyor movable in a horizontal plane around a vertical axis located in a central position with respect to the silo, said annular band conveyor being located in an intermediate position between the radially outermost and innermost openings of the silo, and at least one chute device movable along the length of the band conveyor and adjustable radially thereof so as to be selectively connectable to silo openings in an annular zone extending radially inwards and outwards of the band conveyor thereby to transfer goods between such openings and the annular band conveyor.

2. An apparatus as in claim 1 in which each chute device comprises a plurality of individually adjustable chutes.

3. An apparatus as in claim 1 which further comprises a second band conveyor movable transversely of said annular band conveyor in a substantially horizontal plane, means for transferring silo goods from said annular band conveyor to said second band conveyor, and at least one chute device movable along the length of the second band conveyor and adjustable transversely thereof so as to be selectively operatively positioned with respect to silo openings in a zone extending transversely beyond the second band conveyor, thereby to transfer goods directly between such openings and said second band conveyor.

4. An apparatus as in claim 1, in which the annular band conveyor is carried by two annular rails provided under said conveyor band and rigidly connected therewith in positions co-axial therewith, each of said annular rails being supported on a plurality of rotatably mounted supporting rollers arranged in a circular row co-axial with said conveyor band, the annular band conveyor being guided in its transverse direction by means of a plurality of guiding rollers, each being mounted for rotation on a vertically disposed, horizontally displaceable gudgeon provided under said band conveyor, and engaging one of said annular rails.

5. An apparatus as in claim 1 in which the band conveyor is provided, on its under side, with two circular rows of supporting rollers mounted on the band conveyor for rotation about axes disposed transversely thereof and serving to support the band conveyor on two stationary annular rails arranged under the band conveyor.

6. An apparatus as in claim 1, characterized in that the annular band conveyor is coupled to a driving motor by means of a wire drive extending from a pulley in driven relation with said motor via one or more guiding rollers and a tensioning roller to and around the outer one of the two annular supporting rails of the annular band conveyor.

References Cited in the file of this patent

UNITED STATES PATENTS

| | | |
|---|---|---|
| 2,758,728 | Henry | Aug. 14, 1956 |
| 2,818,162 | Musschoot et al. | Dec. 31, 1957 |
| 2,864,489 | Walker | Dec. 16, 1958 |
| 2,928,522 | Anderson | Mar. 15, 1960 |